United States Patent [19]

Chandler, Jr.

[11] 4,415,456

[45] Nov. 15, 1983

[54] REMOVAL AND DESTRUCTION OF RESIDUAL NITRATE ESTERS IN WASTEWATER

[75] Inventor: Carl D. Chandler, Jr., Dublin, Va.

[73] Assignee: Hercules Incorporated, Wilmington, Del.

[21] Appl. No.: 361,633

[22] Filed: Mar. 24, 1982

[51] Int. Cl.³ .................................................. C02F 1/28
[52] U.S. Cl. .................................... 210/673; 210/674; 210/692; 210/694; 210/903; 210/908
[58] Field of Search ............... 210/668, 670, 673, 674, 210/692, 694, 903, 908; 260/467

[56] References Cited

U.S. PATENT DOCUMENTS

| | | | |
|---|---|---|---|
| 3,763,040 | 10/1973 | Timpe et al. | 210/694 |
| 3,935,006 | 1/1976 | Fischer | 210/674 |
| 4,018,676 | 4/1977 | Hoffsommer et al. | 210/692 |
| 4,066,514 | 1/1978 | Fowler | 203/11 |
| 4,125,445 | 11/1978 | Hurley | 204/149 |
| 4,167,521 | 9/1979 | Fowler et al. | 260/467 |
| 4,267,057 | 5/1981 | Hager et al. | 210/678 |

OTHER PUBLICATIONS

Technical Bulletin (Amberlite ® XAD-4).
Ambersorb ™ Carbonaceous Adsorbents Technical Notes.

*Primary Examiner*—Ivars C. Cintins
*Attorney, Agent, or Firm*—Edmund C. Ross, Jr.

[57] ABSTRACT

A process that captures and destroys organic nitrate esters carried in wastewater effluents which comprises capturing the nitrate esters with a solid adsorbent and then displacing them from the adsorbent with an aqueous regenerating solution that also causes their decomposition and regenerates the adsorbent.

17 Claims, No Drawings

REMOVAL AND DESTRUCTION OF RESIDUAL NITRATE ESTERS IN WASTEWATER

BACKGROUND OF THE INVENTION

1. Field of Use

This invention relates to wastewater effluents and, particularly, to organic nitrate esters carried in such effluents at low levels. This invention, more particularly, relates to capture and destruction of significant amounts of nitrate esters that are so carried and, still more particularly, to use and reuse of solid adsorbents in such capture and destruction.

2. Prior Art

Wastewater effluents carrying nitrate esters are treated in large stirred tanks with lime, caustic, or sodium hydrosulfide by the prior art. The pH of the waste water in these tanks needs to be approximately 11 before effective decomposition of the nitrate esters occurs. After decomposition, the wastewater is separated from any sludge that is formed; it is then neutralized to a pH of about 7 and discharged.

While effective, the prior art suffers from the drawback that the pH adjustments, noted above, require a large amount of alkaline material which increases the amount of solids discharged in the treated wastewater.

3. Objects of the Invention

It is an object of this invention to provide a rapid and economical process for disposal of nitrate esters carried in wastewater effluents.

It is an object of this invention to provide such a process which avoids or otherwise reduces necessity for pH adjustments to these wastewater effluents before and after removal of nitrate esters therefrom.

It is an object of this invention to provide such a process which may utilize a column packed with solid adsorbent for adsorption and decomposition of nitrate esters.

It is an object of this invention to provide such a process which may utilize a stirred tank containing solid adsorbent for adsorption and decomposition of nitrate esters.

These and other objects have been accomplished by this invention as will be apparent from the following disclosure.

BRIEF SUMMARY OF THE INVENTION

The process of this invention entails destroying amounts of nitrate esters carried in a wastewater effluent. The process generally includes intimately contacting an initial fraction of the wastewater effluent with a solid adsorbent to concentrate a first of the amounts of the nitrate esters as an initial adsorbate of the solid adsorbent that thereby becomes spent; intimately contacting the spent adsorbent with an aqueous regenerating fluid that displaces a portion of the adsorbate and decomposes the nitrate ester thereof; washing residual amounts of decomposition products of the nitrate ester and aqueous regenerating fluid from the spent adsorbent to provide a washed adsorbent; intimately contacting a subsequent fraction of the wastewater effluent with the washed adsorbent to concentrate another of the amounts of the nitrate esters as a subsequent adsorbate of the solid adsorbent.

In a preferred embodiment, this invention comprises a process for destroying nitrate esters contained in wastewater at about saturation levels or less, the process embodiment comprising (a) intimately contacting the wastewater with a solid adsorbent in a stirred tank producing a cleansed wastewater having below about 50 ppm by weight of the nitrate esters and a spent adsorbent having the remainder of the nitrate esters as an adsorbate; (b) removing the spent adsorbent from the cleansed wastewater; (c) intimately contacting the spent adsorbent with an aqueous regenerating fluid that displaces a portion of the adsorbate and decomposes the nitrate esters thereof; (d) washing residual amounts of the aqueous regenerating fluid and decomposition products of the nitrate ester from the spent adsorbent so contacted producing a washed adsorbent; (e) reusing the washed adsorbent following the steps above to produce additional amounts of cleansed wastewater having below about 50 ppm by weight of the nitrate esters.

In another embodiment, this invention comprises a process for destroying organic nitrate esters contained in wastewater at saturation levels or less by weight, the process in this other embodiment comprising (a) intimately contacting the wastewater with a solid adsorbent in a column producing a cleansed wastewater having below about 50 ppm by weight of the nitrate esters and the remainder of the nitrate esters as an adsorbate of the adsorbent; (b) separating cleansed wastewater from the adsorbent so contacted; (c) continuing the contacting of step (a) until the cleansed wastewater separated in step (b) contains greater than about 50 ppm by weight of the nitrate esters indicating that the adsorbent so contacted is spent; (d) intimately contacting the spent adsorbent with an aqueous regenerating fluid that displaces a portion of the adsorbate and decomposes the nitrate esters thereof; (e) washing residual amounts of decomposition products of the nitrate esters and the aqueous regenerating fluid from the spent adsorbent so contacted producing a washed adsorbent; and (f) reusing the washed adsorbent following the steps above to produce additional amounts of cleansed wastewater having below about 50 ppm by weight of the nitrate esters.

In still other embodiments, the adsorbent may be employed to concentrate and decompose the nitrate ester in a stirred tank or be regenerated in a column and vice versa.

DETAILED DESCRIPTION OF THE INVENTION

The process of this invention includes adsorption and subsequent decomposition of organic nitrate esters that are dissolved or otherwise carried in wastewater effluents at low levels. Among the wastewater effluents contemplated are those from manufacturing processes relating to munitions, explosives, and pharmaceuticals.

These wastewater effluents normally have a total amount of organic nitrate esters ranging between about 800 ppm by weight and saturation wherein the saturation is below about 5000 ppm. They include such nitrated polyols as nitroglycerin, dinitroglycerin, propylene glycol dinitrate, ethylene glycol dinitrate, diethylene glycol dinitrate, triethylene glycol dinitrate, trimethylolethane trinitrate, and the like, alone, or in combination. The process of this invention removes as much as 98% by weight or more of these amounts, depending, for example, upon the initial level of the nitrate esters. For example, wastewater discharged after processing in accordance with this invention may have 50 ppm by weight nitrate esters or less, as determined by liquid chromatography.

The solid adsorbents of this invention include commercially available adsorbent materials. Among these are pyrolyzed resin (e.g. Rohm and Haas XE-348 carbonaceous resin) or non-pyrolyzed, reticulated resin (e.g. Rohm and Haas XAD-4 polystyrene-divinyl benzene polymer) in irregular or bead form, an activated carbon in pure or modified form, or a pyrolyzed or carbonaceous filament in irregular or bead form.

The particular adsorbent material chosen depends on a number of operational and safety factors. Preferably and advantageously, however, the adsorbent is selected so that there is little or no need for pH adjustments to the wastewater effluent before or after adsorption of the organic nitrate ester therefrom.

The adsorbent material is additionally selected, of course, to have a capacity to adsorb the particular nitrate ester or esters carried in the wastewater effluent. The amount of adsorbent employed depends on this intrinsic capacity as well as the relative amount of nitrate ester in, and to be removed from, the wastewater. For non-pyrolyzed resins, about 16–18 bed volumes per hour for a stream of about 800–1800 ppm nitrate ester is the mean flow rate. For pyrolyzed resins and activated carbon, about 16–32 bed volumes per hour is recommended. These values, however, are highly dependent upon the adsorbent and nitrate ester involved.

Safety considerations are also important in adsorbent selection since the nitrate esters are explosive compounds which are thermally and mechanically sensitive. Appropriate systems hazards analyses are required before implementation. The adsorbent selected must be compatible with the nitrate esters, not contain an excessive concentration of nitrate esters at saturation, have an acceptable temperature rise during the regeneration step, and not contain appreciable quantities of residual nitrate esters after the decomposition cycle. The operation should be conducted in such a manner that drying out of nitrate esters contaminated adsorbent cannot occur.

In one embodiment of this invention, disposition of amounts of nitrate ester is accomplished with two and, preferably, three columns packed with adsorbent, if the ester is to be reduced to extremely low levels (e.g. below about 5 ppm). In this latter case, two columns are used in series to adsorb the nitrate ester from a wastewater effluent. The third column is held in reserve and may be operated in a regeneration mode.

When analysis of the discharge from the second column in the series indicates undesired breakthrough (e.g., the discharge has above about 50 ppm nitrate esters) of nitrate ester, the third column is then operated in series with the second column and the first column (now spent) is regenerated. A regeneration solution is pumped through the spent first column so that it can become (after aqueous wash) the secondary column upon breakthrough of nitrate ester from the second and third columns.

In another embodiment, a stirred tank reactor holds the solid adsorbent. In this embodiment, the adsorbent and wastewater effluent containing the nitrate ester are stirred until analysis (e.g., by liquid chromatography) shows that there has been a reduction of nitrate ester in the waste water to a predetermined level satisfactory for discharge thereof. The stirred tank is then filtered on a belt filter or the like. The resulting cleansed wastewater is discharged and the solid adsorbent is retained for further adsorption of nitrate esters or regeneration.

Sodium hydroxide, sodium hydrosulfide, hydroxylamine sulfate or other such ingredient which decomposes nitrate ester is employed as an aqueous solution to regenerate the solid adsorbent. A small amount (e.g., between about 1 and 20 percent by weight) of solvent for the nitrate ester (or decomposition of products therefrom) may be included in the aqueous regenerating solution. The solvent facilitates removal of nitrate ester from the adsorbent. High concentrations of solvent and/or regenerating reagent may increase decomposition temperature. The solvent may be, for example, a lower alkanol such as methanol, ethanol or the like. The solvent facilitates removal of adsorbed nitrate ester and decomposition products thereof from the adsorbent.

With packed columns, the aqueous regenerating solution containing an above ingredient preferably is pumped continuously through the column undergoing regeneration. The aqueous regenerating solution may be pumped from a reserve tank which is continuously replenished with the decomposing ingredient. In slurry or stirred tank reactors, such aqueous regenerating solution is combined with the spent adsorbent in the reactor until analysis (e.g., liquid chromatography) indicates completion of the regeneration. The slurry is then filtered and the regenerating solution returned to its holding tank. The holding tank containing the regenerating solution is replenished with additional amounts of the decomposing ingredient.

After exposure to the regenerating solution, the solid adsorbent is cleansed with an aqueous wash. The aqueous wash removes any remaining regenerating solution, incidental amounts of the nitrate ester and decomposition products from the nitrate ester. The solid adsorbent may then be reused to adsorb additional amounts of nitrate ester.

In certain instances, however, the solid adsorbent advantageously may receive additional treatments before reuse. The additional treatments include a treatment of the solid adsorbent with a mildly acidic (pH about 5–6) solution (e.g. sodium bisulfite) to remove products resulting from the treatment with the regenerating solution. The mildly acidic solution is used because certain transformed products may contaminate the resin and reduce its subsequent adsorptive capacity. The mildly acidic solution may also contain a solvent for nitrate ester and/or products resulting from treatment thereof by the regenerating solution.

The following examples illustrate this invention in certain of its aspects but are not intended as limiting of its scope; those skilled in the art will recognize that many modifications of these examples may be made without departing for the true scope of the invention set forth. Critical design and operating provisions are necessary to insure safety of this process; such provisions are obtainable through hazards analysis studies known to the art.

All parts and percentages are by weight unless specifically noted otherwise. All temperatures are in degrees centigrade (°C.) unless specifically noted otherwise. The abbreviation "ppm" stands for parts per million by weight. The results of these Examples indicate that although there may be some loss of adsorption capacity after initial use, such capacity appears to stabilize at a given value upon further use and reuse.

EXAMPLE 1

About 100 parts of wastewater containing approximately 1388 parts per million (ppm) of diethylene glycol dinitrate (DEGDN) from a washing operation were stirred with 2.4 parts of either Rohm and Haas Amberlite ® XAD-4 reticulated resin[1] or XE-348 carbonaceous resin[2]. The DEGDN concentration in the wastewater was reduced below 50 ppm as determined by liquid chromatography operating in a reverse phase mode. After adsorption for a period of 15 minutes, the wastewater was separated from the resin by filtration. The resin was stirred for 15–30 minutes with 25 parts of 5 percent hydroxylamine sulfate in a 1:4 methanol:water solution at a pH of approximately 11. The regenerated resin was separated by filtration and washed with water for subsequent reuse.

[1]. A polymer adsorbent made of a crosslinked polystyrene polymer having macroreticular structure. The adsorbent appears as hard, hydrated, opaque beads with a 0.30–0.45 mm average particles diameter, 0.45–0.60 mm harmonic mean particle size, 53% solids, true wet density 1.02 g/ml, skeletal density 1.08 g/ml, bulk density 44 lbs./cu.ft., hydradated porosity of 0.50 pore/ml bead, hydrated surface area 725 sq. meters/g and average pore diameter 40 Angstrom according to Amberlite X Technical Bulletin Fluid Process Chemicals (Rohm and Haas) 1978.
[2]. See Example 2.

EXAMPLE 2

A column containing 16 parts of Rohm and Haas Ambersorb ® XE-348[1] carbonaceous resin was treated with 5500 parts of wastewater containing 1200 ppm of DEGDN from a washing operation of the same before breakthrough. After the 50 ppm breakthrough, the column was partially drained and treated with a 5 percent solution of hydroxylamine sulfate[2] in a 1:4 ethanol:water solution at a pH of approximately 11. Initially there was an increase of approximately 4° F. in the temperature of the column bed. After regeneration of the column for approximately 45 minutes the DEGDN in the regenerate solution leaving the column was not detected (i.e. less than 1 ppm measured by liquid chromatography). The column was washed with water and reused.

[1]. A carbonaceous adsorbent that is intermediate between carbonaceous and polymeric adsorbents. The adsorbent is in the form of hard, nondusting, black spheres having a surface area of 500 ($N_2$ BET method) m/g; bulk density 0.60 g/cc, particle density (Hg Displacement) 0.91 g/cc; skeleton density 1.95 g/cc; pore volume 0.58 cc/g, particle size 20–50 (U.S. Sieve Series), crush strength kg/particle 1.0, ash content 0.5 according to "Ambersorb Carbonaceous Adsorbents" 1977 Rohm and Haas.
[2]. Fisher Scientific—Pittsburg, PA

EXAMPLE 3

A column containing 45 parts of Rohm and Haas Ambersorb ® XE-348[1] carbonaceous resin was treated with 3364 parts of wastewater from a nitroglycerin manufacturing operation and containing 2326 ppm of dinitroglycerin and 931 ppm of nitroglycerin before breakthrough. After the breakthrough (50 ppm), the column was regenerated using a 5 percent aqueous sodium hydroxide solution containing 20 percent ethanol. When the regenerate solution leaving the column contained less than 50 ppm of nitrate ester (approximately 20 minutes) the column was washed with water, followed by 10 percent sodium bisulfite solution in 20 percent ethanol to remove aldehyde and ketone decomposition products. After a final rinsing with water, the column was ready for reuse.

[1]. See Example 2.

What is claimed is:

1. A process for destroying amounts of an organic nitrate ester carried at low levels in a wastewater effluent, said process comprising:

intimately contacting an initial fraction of said wastewater effluent with a solid adsorbent to concentrate a first of said amounts as an initial adsorbate of said solid adsorbent that thereby becomes spent;

intimately contacting said spent adsorbent with an aqueous regenerating fluid comprising a solvent for said nitrate ester and that displaces a portion of said adsorbate and decomposes said nitrate ester thereof;

washing residual amounts of decomposition products of said nitrate ester and said aqueous regenerating fluid from said spent adsorbent so contacted to provide a washed adsorbent;

intimately contacting a subsequent fraction of said wastewater effluent with said washed adsorbent to concentrate another of said amounts as a subsequent adsorbate of said solid adsorbent.

2. A process in accordance with claim 1, wherein said adsorbent comprises an adsorbent material selected from pyrolyzed resins, reticulated resins, activated charcoal, and pyrolyzed carbonaceous filament.

3. A process in accordance with claim 1, wherein said aqueous regenerating fluid comprises an ingredient selected from sodium hydroxide, sodium hydrosulfide and a hydroxylamine.

4. A process in accordance with claim 1, wherein said solvent comprises an alcohol.

5. A process in accordance with claims 1, 2, 3 or 4 wherein said nitrate ester is selected from the group consisting of nitroglycerin, propylene glycol dinitrate, ethylene glycol dinitrate, diethylene glycol dinitrate, triethylene glycol dinitrate and trimethylolethane trinitrate.

6. A process for destroying nitrate esters contained in wastewater at about saturation or less, said process comprising:

(a) intimately contacting said wastewater with a solid adsorbent in a stirred tank producing a cleansed wastewater having below about 50 ppm of said nitrate esters and a spent adsorbent having the remainder of said nitrate esters as an adsorbate;

(b) removing said spent adsorbent from said cleansed wastewater;

(c) intimately contacting said spent adsorbent with an aqueous regenerating fluid comprising a solvent for said nitrate ester and that displaces a portion of said adsorbate and decomposes said nitrate esters thereof;

(d) washing residual amounts of said aqueous regenerating fluid and decomposition products of said nitrate esters from said spent adsorbent so contacted producing a washed adsorbent;

(e) reusing said washed adsorbent following the aforesaid steps to produce additional amounts of cleansed wastewater having below about 50 ppm of weight of said nitrate esters.

7. A process in accordance with claim 6, wherein said regenerating fluid comprises an ingredient cable of nitrate ester destruction selected from the group consisting of sodium hydroxide, sodium hydrosulfide and a hydroxylamine sulfate.

8. A process in accordance with claim 6 or 7 wherein said solid adsorbent comprises an adsorbent material selected from the group consisting of pyrolyzed or reticulated resins, activated carbon, and pyrolyzed carbonaceous filament.

9. A process in accordance with claim 6, wherein said solvent comprises an alcohol.

10. A process in accordance with claim 9, wherein said nitrate esters are selected from the group consisting of dinitroglycerin, nitroglycerin, propylene glycol dinitrate, ethylene glycol dinitrate, diethylene glycol dinitrate, triethylene glycol dinitrate, and trimethylolethane trinitrate.

11. A process for destroying organic nitrate esters contained in wastewater at about saturation or less by weight, said process comprising:
   (a) intimately contacting said wastewater with a solid adsorbent in a column producing a cleansed wastewater having below about 50 ppm by weight of said nitrate esters and the remainder of said nitrate esters as an adsorbate of said solid adsorbent;
   (b) separating cleansed wastewater from said adsorbent so contacted;
   (c) continuing the contacting of step (a) until said cleansed wastewater separated in step (b) contains greater than about 50 ppm by weight of said nitrate esters indicating that said adsorbent so contacted is spent;
   (d) intimately contacting said spent adsorbent with an aqueous regenerating fluid comprising a solvent for said nitrate ester and that displaces a portion of said adsorbate and decomposes said nitrate esters thereof;
   (e) washing residual amounts of decomposition products and said aqueous regenerating fluid from said spent adsorbent so contacted producing a washed adsorbent;
   (f) reusing said washed adsorbent following the aforesaid steps to produce additional amounts of cleansed wastewater having below about 50 ppm by weight of said nitrate esters.

12. A process in accordance with claim 11, wherein said regenerating fluid is pumped between a column carrying said adsorbent and a tank holding a reserve of said regenerating fluid and undergoing replenishment.

13. A process in accordance with claim 11, wherein said solvent comprises an alcohol.

14. A process in accordance with claim 13, wherein said alcohol comprises a lower alkanol.

15. A process in accordance with claim 11, 12, 13 or 14 wherein said regenerating fluid comprises an ingredient capable of destroying nitrate esters selected from sodium hydroxide, sodium hydrosulfide and a hydroxylamine.

16. A process in accordance with claim 15, wherein said nitrate esters are selected from the group consisting of dinitroglycerin, nitroglycerin, propylene glycol dinitrate, ethylene glycol dinitrate, diethylene glycol dinitrate, triethylene glycol dinitrate and trimethylolethane trinitrate.

17. A process in accordance with claim 16, wherein said solid adsorbent comprises an adsorbent material selected from pyrolyzed or reticulated resins, activated carbon, and pyrolyzed carbonaceous filament.

* * * * *

UNITED STATES PATENT AND TRADEMARK OFFICE
CERTIFICATE OF CORRECTION

PATENT NO. : 4,415,456

DATED : November 15, 1983

INVENTOR(S) : Carl D. Chandler, Jr.

It is certified that error appears in the above-identified patent and that said Letters Patent are hereby corrected as shown below:

Second paragraph of the "Abstract of the Disclosure" the following was omitted:

"The U.S. Government has rights in this invention under Contract DAAA09-77-C-4007".

Signed and Sealed this

Sixth Day of March 1984

[SEAL]

Attest:

Attesting Officer

GERALD J. MOSSINGHOFF

Commissioner of Patents and Trademarks